United States Patent [19]
Miller

[11] Patent Number: 5,908,223
[45] Date of Patent: Jun. 1, 1999

[54] CHILD SEAT RESTRAINING SYSTEM WITH TONGUE ASSEMBLY

[75] Inventor: Peter E. Miller, Noblesville, Ind.

[73] Assignee: Indiana Mills & Manufacturing, Inc., Westfield, Ind.

[21] Appl. No.: 09/007,311

[22] Filed: Jan. 15, 1998

[51] Int. Cl.[6] .......................... A47D 15/00; A62B 35/00; B60R 22/12
[52] U.S. Cl. .................. 297/484; 297/467; 297/468; 297/481; 297/482; 297/486
[58] Field of Search .................. 297/484, 467, 297/468, 481, 482, 486, 487

[56] References Cited

U.S. PATENT DOCUMENTS

| | | |
|---|---|---|
| D. 359,710 | 6/1995 | Chinni et al. . |
| D. 364,124 | 11/1995 | Lortz et al. . |
| 5,031,962 | 7/1991 | Lee .......................................... 297/484 |
| 5,074,588 | 12/1991 | Huspen ................................ 297/484 X |
| 5,125,718 | 6/1992 | Czernakowski et al. ................ 297/484 |
| 5,283,933 | 2/1994 | Wiseman et al. . |
| 5,380,067 | 1/1995 | Turvill et al. ............................. 297/484 |
| 5,387,028 | 2/1995 | Fulgenzi et al. ..................... 297/467 X |
| 5,398,997 | 3/1995 | McFalls ............................... 297/484 X |

*Primary Examiner*—Peter M. Cuomo
*Assistant Examiner*—Rodney B. White
*Attorney, Agent, or Firm*—Woodard, Emhardt, Naughton, Moriarty & McNett

[57] ABSTRACT

A seat belt system for restraining a vehicle occupant includes a left webbing having a shoulder portion and a lap portion separated by a tongue assembly, a right webbing having a shoulder portion and a lap portion separated by a right tongue assembly, and a buckle for receiving each of the tongue assemblies. Each tongue assembly includes a tongue defining a latch plate and a webbing slot. In addition, the tongue assemblies include a webbing guide having a channel extending from the top of the webbing assembly to adjacent the slot, the channel maintaining the tongue in substantial alignment with the shoulder portion of the webbing.

5 Claims, 7 Drawing Sheets

CHILD SEAT RESTRAINING SYSTEM WITH TONGUE ASSEMBLY

BACKGROUND OF THE INVENTION

The present invention relates to a safety restraining system for restraining an occupant of a vehicle, and more particularly to an improved tongue assembly for use with child seats.

U.S. Pat. No. 5,398,997 discloses at least one variety of child seat safety restraining system using a five point webbing harness system to restrain the occupant within the seat. In this system, there are cooperable dual tongues disposed on each of the left and right webbings. Each of the tongues is received in a single buckle positioned between the legs of an occupant.

Figure 1:
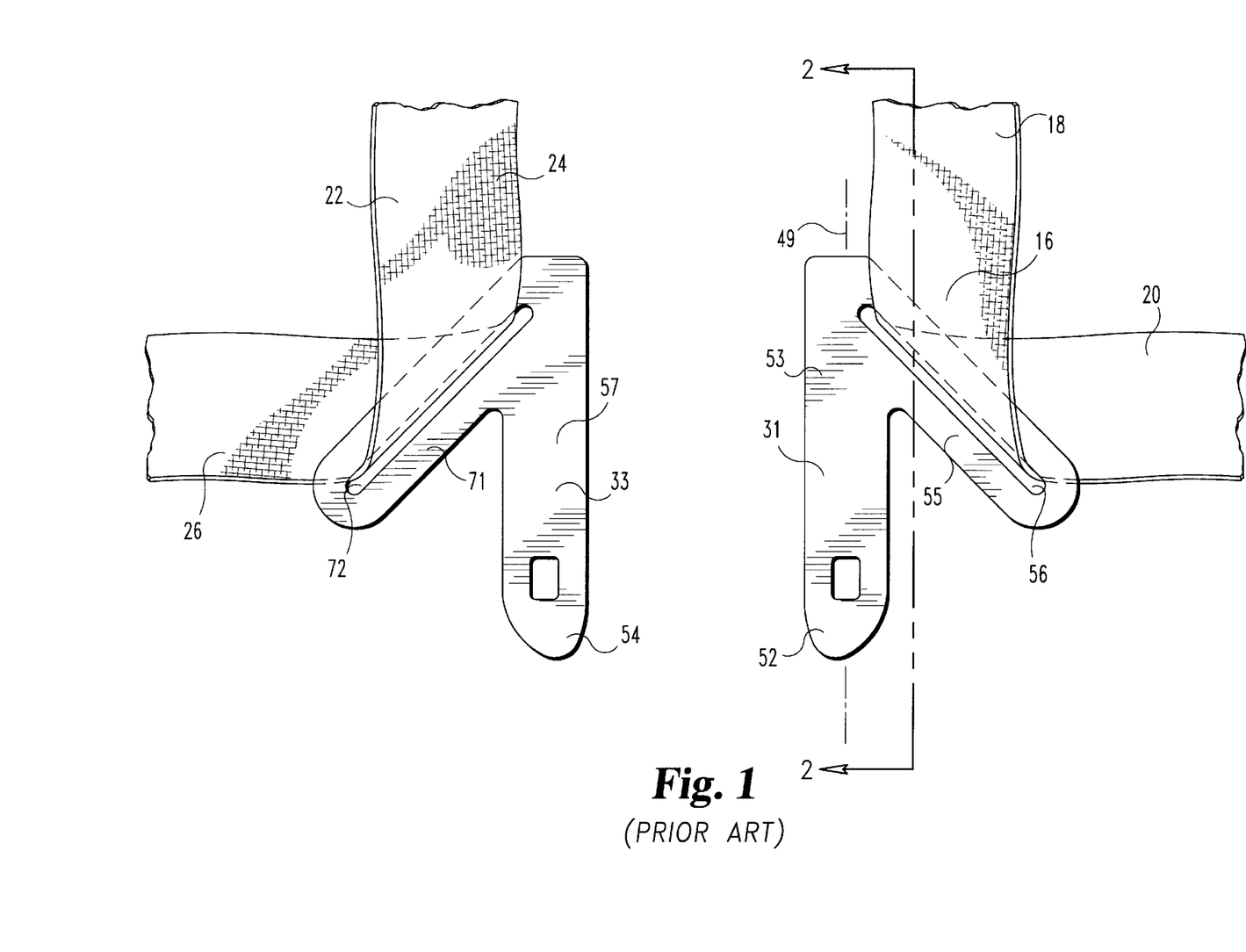
FIG. 1 is a front view of a prior art dual tongue assembly.
Figure 2:
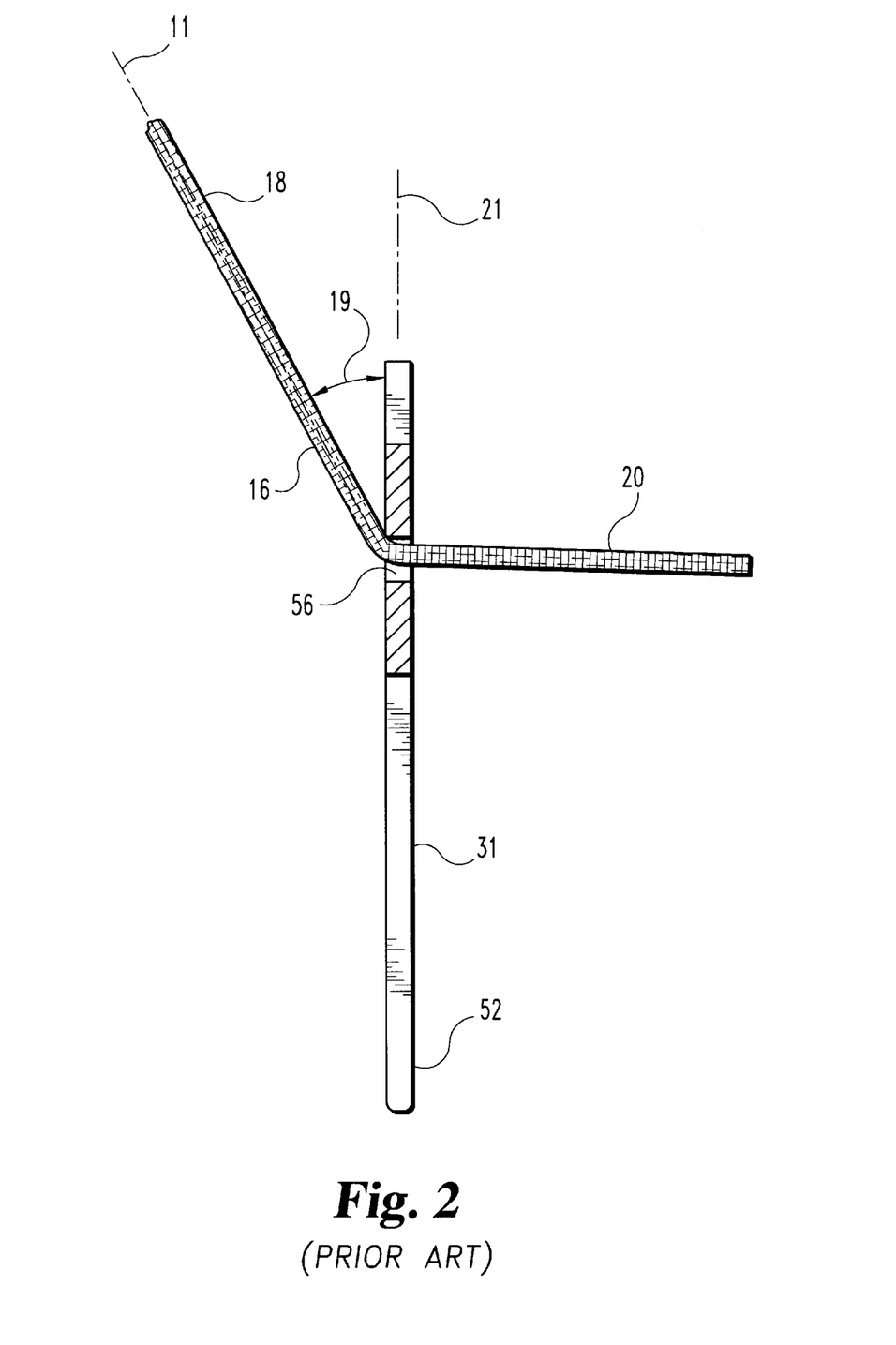
FIG. 2 is a cross-sectional view taken along section line 2—2 of the prior art dual tongue assembly of FIG. 1.

An example of prior art dual tongues is shown in FIGS. 1 and 2. Right tongue 31 includes a latch plate 52, web connection portion 55, and a substantially planar front surface 53. The web connection portion 55 defines a slot 56 extending from the front to the back. As known in the art, slot 56 is disposed at approximately a 45° angle with respect to longitudinal axis 49 of latch plate 52. The angle of slot 56 facilitates the transition of web 16 between shoulder portion 18 and lap portion 20. Opposing left tongue 33 includes latch plate 54, a web connection portion 71, and a substantially planar front surface 57. The web connection portion 71 defines slot 72 adapted to receive a web. Again, slot 72 is angled with respect to the latch plate axis to facilitate the transition between the web shoulder portion 24 and the lap portion 26.

Figure 3:
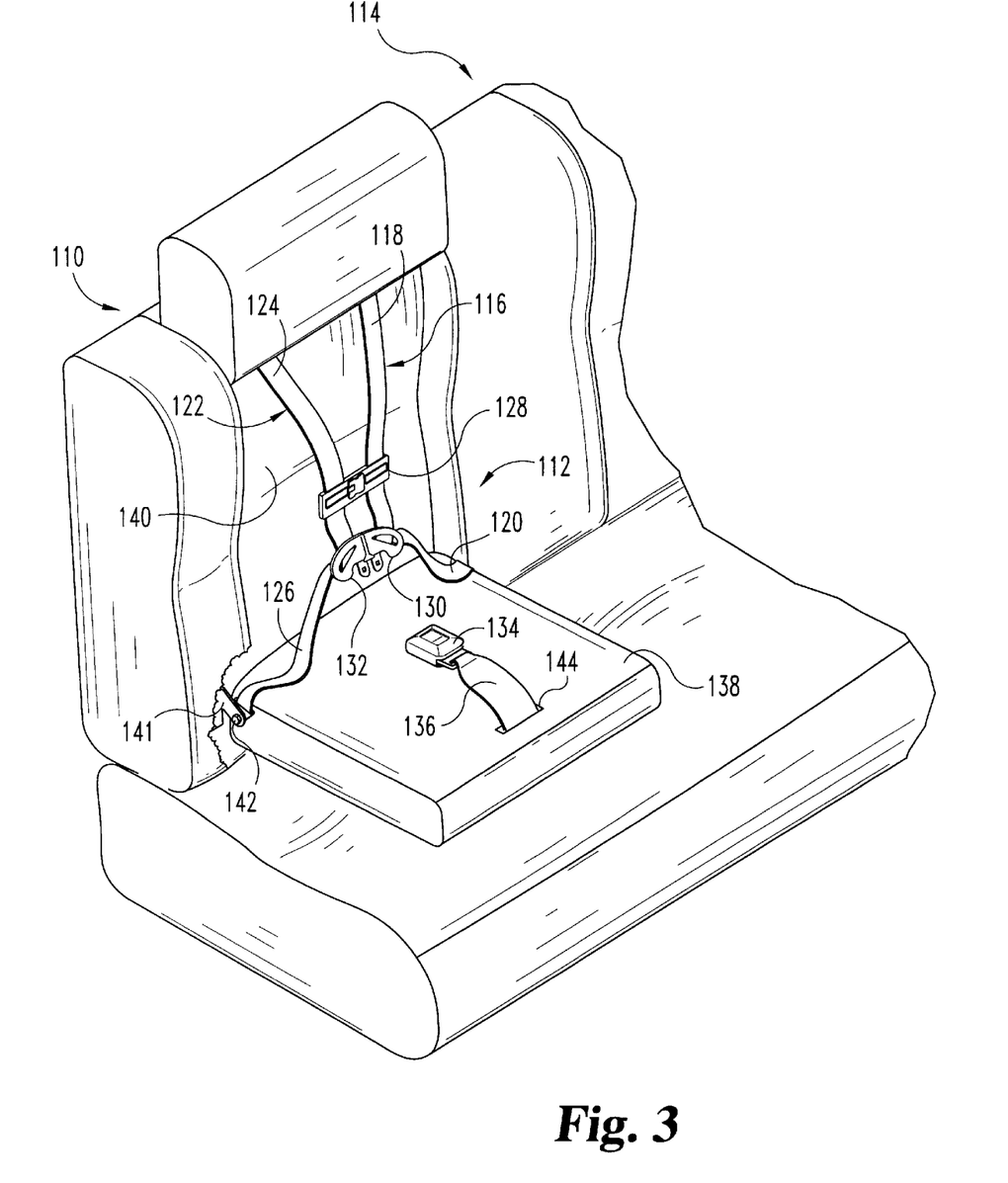
FIG. 3 is a perspective view of a child seat with a restraining system and tongue assembly according to the present invention.

The prior art dual tongues may be used with a five point harness system such as that shown in FIG. 3. Right web 16 extends through slot 56 with an upper shoulder portion 18 above the slot and a lower lap portion 20 below the slot. Similarly, left web 22 extends through slot 72 of left tongue 33 with an upper shoulder portion 24 above the slot and a lower lap portion 26 below the slot.

As shown in FIG. 2, a cross-section taken along section line 2—2 of FIG. 1, as webbing 16 extends through slot 56 in tongue 31, tongue 31 tends to rotate away from webbing shoulder portion 18. Specifically, longitudinal axis 21 of tongue 31 is skewed with respect to longitudinal axis 17 of shoulder portion 18. This is shown by the angle 19 generated between shoulder portion 18 and tongue 31. When latch plate 52 is received in a buckle (not shown) the web can be forced to lay along longitudinal axis 21 of the tongue. However, when latch plate 52 is disconnected from a buckle, there is nothing to counteract the force of the webbing extending through slot 56 tending to rotate the tongue. Thus, tongue 31 typically rotates with respect to the web when latch plate 52 is not engaged with a buckle.

Rotation of the tongue with respect to the webbing in a child seat harness causes at least two problems that, although not affecting safety, may frustrate the user. Specifically, it will be appreciated that as the tongue rotates with respect to the webbing, the webbing may move more freely through slot 56. This permits the tongue to slide down the web until it contacts the bottom of the seat or some other structure. Thus, each time the seat is used, the user may be required to readjust the tongue to the previous position. Additionally, the web shoulder portion 16 tends to run substantially parallel to the back of the seat. Therefore, when the tongue rotates with respect to the web shoulder portion, it tends to extend outwardly from the rear of the seat. This presents a difficulty in child seats where the bottom is folded with respect to the back to form a folded storage configuration.

Therefore, there remains a need for a tongue assembly that is cooperable with a child seat restraining system to provide a convenient mechanism for maintaining the tongue in substantial alignment with the shoulder portion of the webbing to assist in maintaining the position of the tongue and to make folding of foldable seats more convenient.

SUMMARY OF THE INVENTION

One embodiment according to the present invention is a restraining system, comprising a seat having a back and a bottom with a webbing system. The webbing system includes a left web having a first portion engaging the back and an opposite second portion engaging the bottom, and a right webbing having a first portion engaging the back and an opposite second portion engaging the bottom. A left tongue assembly is disposed on the left webbing and a similar right tongue assembly is disposed on the right webbing. Each tongue assembly is engageable with a buckle attached to the seat. The left and right tongue assemblies separate the left and right webbings, respectively, into a shoulder portion having a longitudinal axis extending between the tongue assembly and the first portion and a lap portion extending between the tongue assembly and the second portion. Each tongue assembly includes a tongue having a latch plate and a slot adapted to receive the webbing. The tongue assembly also includes a webbing guide defining a webbing passage for routing the webbing from the shoulder portion to the slot. The webbing guide maintains the tongue in substantial alignment with the longitudinal axis of the shoulder portion of the respective webbings.

One object of the present invention is to provide a tongue assembly that maintains a tongue in substantial alignment with a shoulder portion of the restraining system.

A further object of the present invention to provide a tongue assembly having a tongue latch plate and a webbing channel, the webbing channel maintaining the tongue latch plate in substantial alignment with the webbing shoulder portion.

Yet a further object of the present invention is to provide a tongue assembly having a webbing guide that limits movement of the tongue assembly along the webbing absent manual force applied to the tongue assembly, whereby the tongue assembly is maintained in a user set position until it is repositioned by the user.

These and other objects of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 3, there is shown an embodiment of the restraining system 110 according to the present invention. The present invention can be used in a variety of seat belt systems and seating arrangements, including removable child seats and child seats integral with a vehicle. By way of example, the restraining system 110 is shown as a child restraining system associated with a child seat 112 of a vehicle seat 114. The restraining system 110 of the child seat 112 includes a right seat belt webbing 116, a left seat belt webbing 122, tongue assemblies 130 and 132, and buckle 134.

In the configuration of FIG. 3, the seat belt webbings 116 and 122 each have two distinct sections. A shoulder section 118 of webbing 116 is connected at the upper end to seat back 140 and extends to tongue assembly 130. Lap portion 120 of webbing 116 extends from tongue assembly 130 to seat bottom 138. In a similar fashion, left webbing 122 includes a shoulder portion 124 connected at the upper end to seat back 140 and extending to tongue assembly 132. Left webbing 122 also includes a lap portion 126 extending from tongue assembly 132 to seat bottom 138. To complete the five point restraining system 110, buckle 134 is connected to seat bottom 138 by webbing portion 136 extending through slot 144. As is well known in the art, webbings 116 and 122 may be connected to an adjustable retractor mechanism (not shown) to provide adjustment of the webbings to suit various sizes of occupants. Additionally, to provide further adjustment, a two part adjustment member 128 is slidable on shoulder portions 118 and 124, and includes a connection member to maintain the shoulder portions in a desired spatial relation.

Preferably, child seat 112 includes a connecting member 141 and a pivot pin 142 on a left side and a similar connector and connecting pin on the right side (not shown) permitting seat bottom 138 to pivot with respect to seat back 140. Seat bottom 138 may pivot between a seating position shown in FIG. 3 and a stowed position (not shown) with seat bottom 138 and seat back 144 adjacent one another in a folded position.

Figure 4:
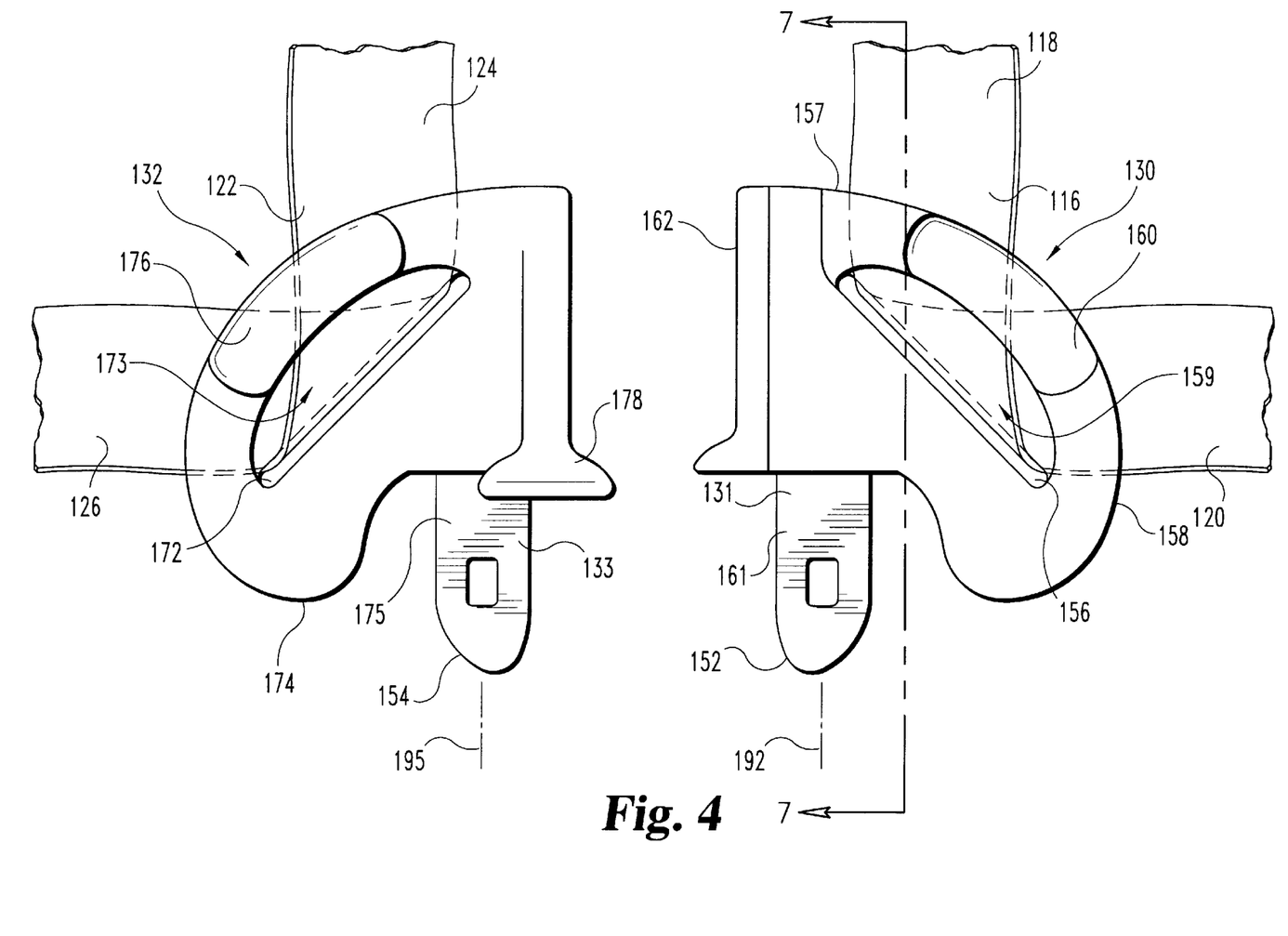
FIG. 4 is a front view of the tongue assembly of FIG. 3 according to the present invention.

FIG. 4 illustrates the left tongue assembly 132 and the right tongue assembly 130 of FIG. 3. Right tongue assembly 130 includes a right tongue 131 and a web guide 158. As is conventional in the art, right tongue 131 is a substantially flat piece of material such as right tongue 31 shown in FIG. 1 and includes a substantially planar front surface 161 and an opposing back surface. Right tongue 131 further includes a latch plate 152 for engagement with buckle 134 (FIG. 3) and a latch plate body 153 (FIG. 6) shown in dashed lines. Further, a right tongue 131 includes a slot 156 adapted to receive a portion of the web therethrough. As will be understood by those skilled in the art, right tongue 131 is preferably a metallic plate. Tongues are often formed of steel, although any material having sufficient strength may be utilized to form the latch plate. It will be understood that the construction of right tongue 131 is formed in a conventional manner and is substantially similar to the prior art right tongue 31 shown in FIG. 1 except as noted herein.

Figure 6:
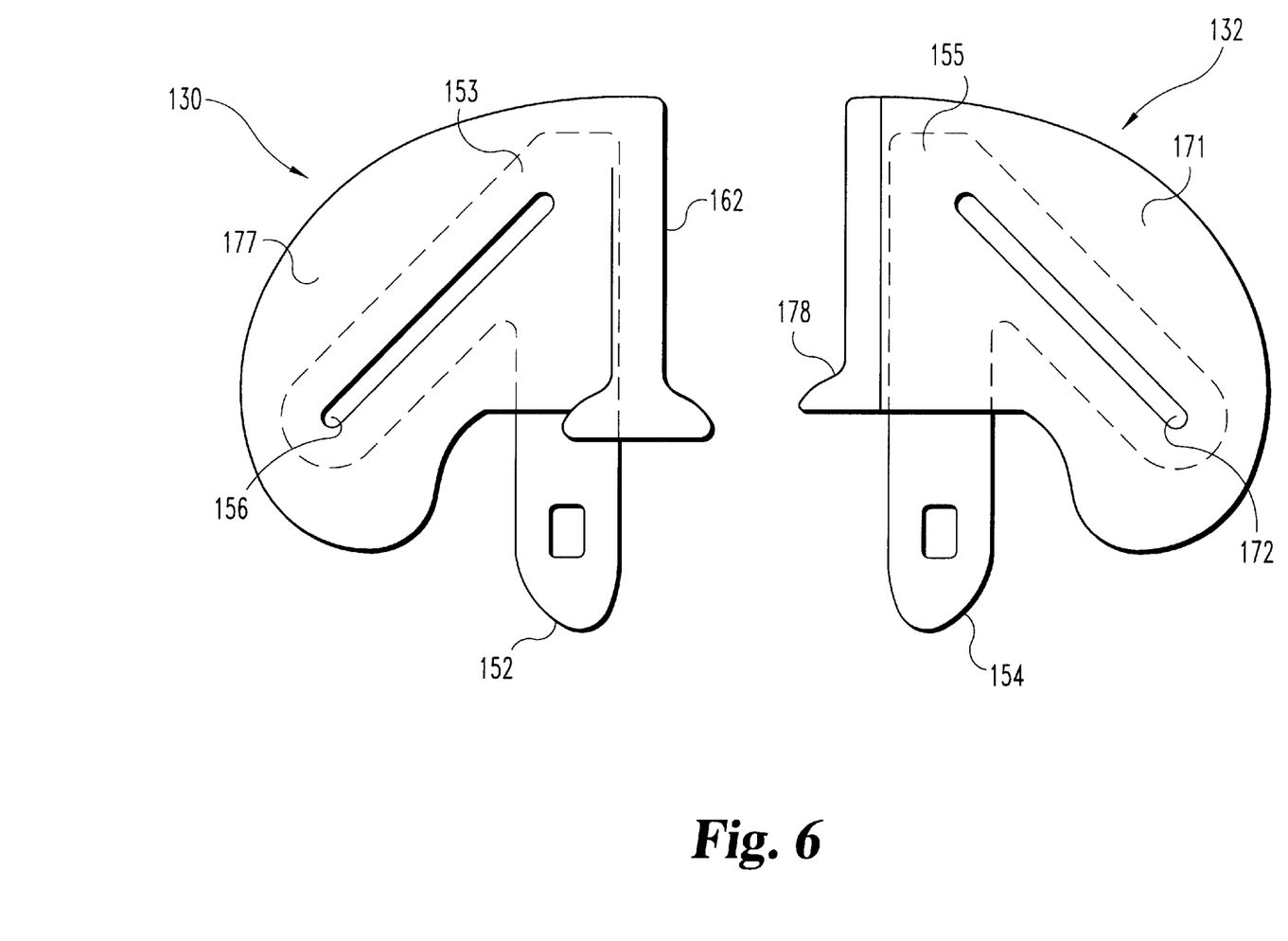
FIG. 6 is a rear view of the tongue assembly of FIG. 4.

According to a preferred embodiment of the present invention, right tongue 131 includes a novel web guide 158 surrounding latch plate body 153 (FIG. 6). Web guide 158 is preferably formed of molded plastic and is molded directly onto right tongue 131. Although in a preferred embodiment web guide 158 is molded onto right tongue 131, it is contemplated that the web guide may be otherwise affixed to the tongue or formed as an integral part of the tongue.

Figure 5:
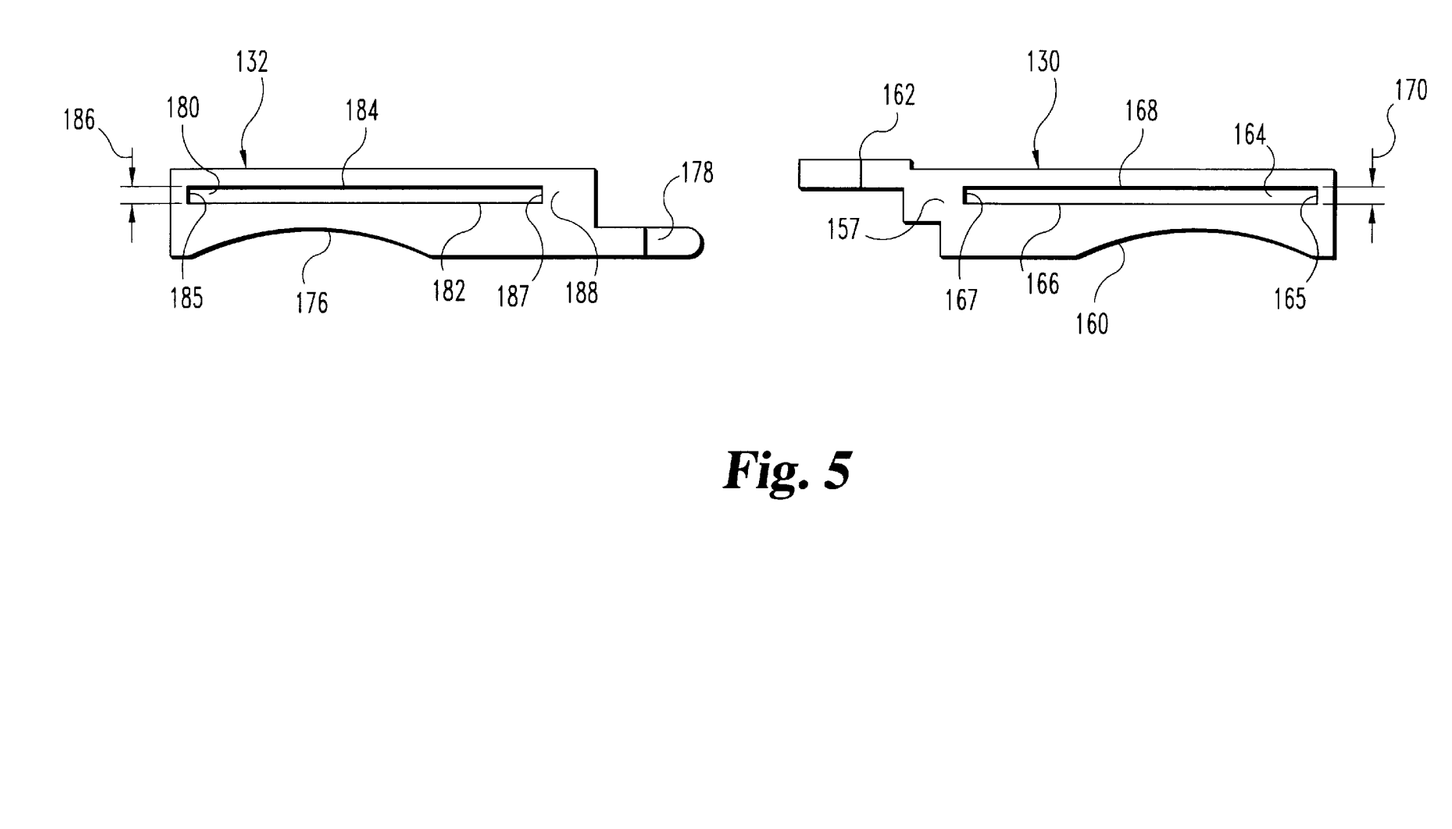
FIG. 5 is a top view of the tongue assembly of FIG. 4.

Referring now to FIG. 5, web guide 158 is molded to define a web guiding channel 164 having a width 170. Channel 164 is defined by front wall 166, opposing back wall 168, and side walls 165 and 167. Channel 164 extends from the upper surface 157 of web guide 158 and into open area 159. Open area 159 terminates adjacent slot 156. Although open area 159 is shown in the preferred embodiment, it will be understood that open area 159 is not required and that channel 164 could be substantially closed up to and including slot 156 such that the entire front area of web guide 158 may be a continuous area of molded plastic. Web 116 is guided by channel 164 to slot 156 and out the backside of the tongue assembly.

Web guide 158 further includes a first guide 162 for mating with a cooperable portion on left tongue 133. Additionally, web guide 158 defines a finger depression 160. It will be understood that finger depression 160 provides the user with a convenient surface for applying pressure to web guide 158 to maneuver it with respect to webbing 116 and/or buckle 134.

Left tongue 133 is cooperable with right tongue 131 and of similar construction. Left tongue 133 has a substantially planar front surface 175 and an opposing back surface. Left tongue 133 includes a latch plate 154 adapted for engagement with buckle 134 (FIG. 3). Left tongue 133 further includes a latch plate body 155 (FIG. 6) shown in dashed lines, with a slot 172 defined therein. Again, left tongue 133 is formed in a conventional manner and is substantially similar to the prior art left tongue 33 shown in FIG. 1 except as noted herein.

Left tongue 133 includes a novel web guide 174 (FIG. 4) surrounding a portion of latch plate body 155 (FIG. 5). Web guide 174 is preferably formed of molded plastic and is molded directly onto left tongue 133. As previously explained, it is within the spirit of the present invention that the web guide be otherwise affixed to tongue 133 or formed as an integral part of tongue 133.

Referring now to FIG. 5, web guide 174 defines a channel 180 having a width 186. Channel 180 is defined by front wall 182, opposing back wall 184, and side walls 185 and 187. Channel 180 extends from the upper surface 188 of web guide 174 and into open area 173. Open area 173 terminates adjacent slot 172. Although open area 173 is shown in the preferred embodiment, it will be understood that open area 173 is not required and that channel 180 could be substantially closed up to and including slot 172 such that the entire front area of web guide 158 may be a continuous area of molded plastic. Web 122 is guided by channel 180 to slot 172 and out the backside of the tongue assembly 133.

Web guide 174 further includes a second guide 178 for mating with cooperable first guide 162 on right tongue assembly 130. Additionally, web guide 174 defines a finger depression 176. It will be understood that finger depression 176 provides the user with a convenient surface for applying pressure to the web guide to maneuver it with respect to webbing 122 and/or buckle 134.

Right webbing 116 and left webbing 122 of restraining system 110 shown in FIG. 3, are routed through tongue assemblies 130 and 132, respectively, as shown in FIG. 4.

Referring specifically to right tongue assembly 130, shoulder portion 118 extends through channel 164 and into open area 159. The webbing is then guided through slot 156 extending toward the back surface 177. It will be appreciated that slot 156 delineates the change from shoulder portion 118 to lap portion 120. As shown, slot 156 is positioned at substantially a 45° acute angle with respect longitudinal axis 192 of latch plate 152 to accomplish the approximately 90° turn between shoulder portion 118 and lap portion 120.

Referring now to left tongue assembly 132, shoulder portion 124 extends through channel 180 and into open area 173. The webbing is guided through slot 172 and extends beyond back surface 171. It will be appreciated that slot 172 delineates the change from shoulder portion 124 to lap portion 126. As noted above, slot 172 is positioned at substantially a 45° angle with respect to longitudinal axis 195 of latch plate 154 to accomplish the approximately 90° turn between shoulder portion 124 and lap portion 126.

Figure 7:
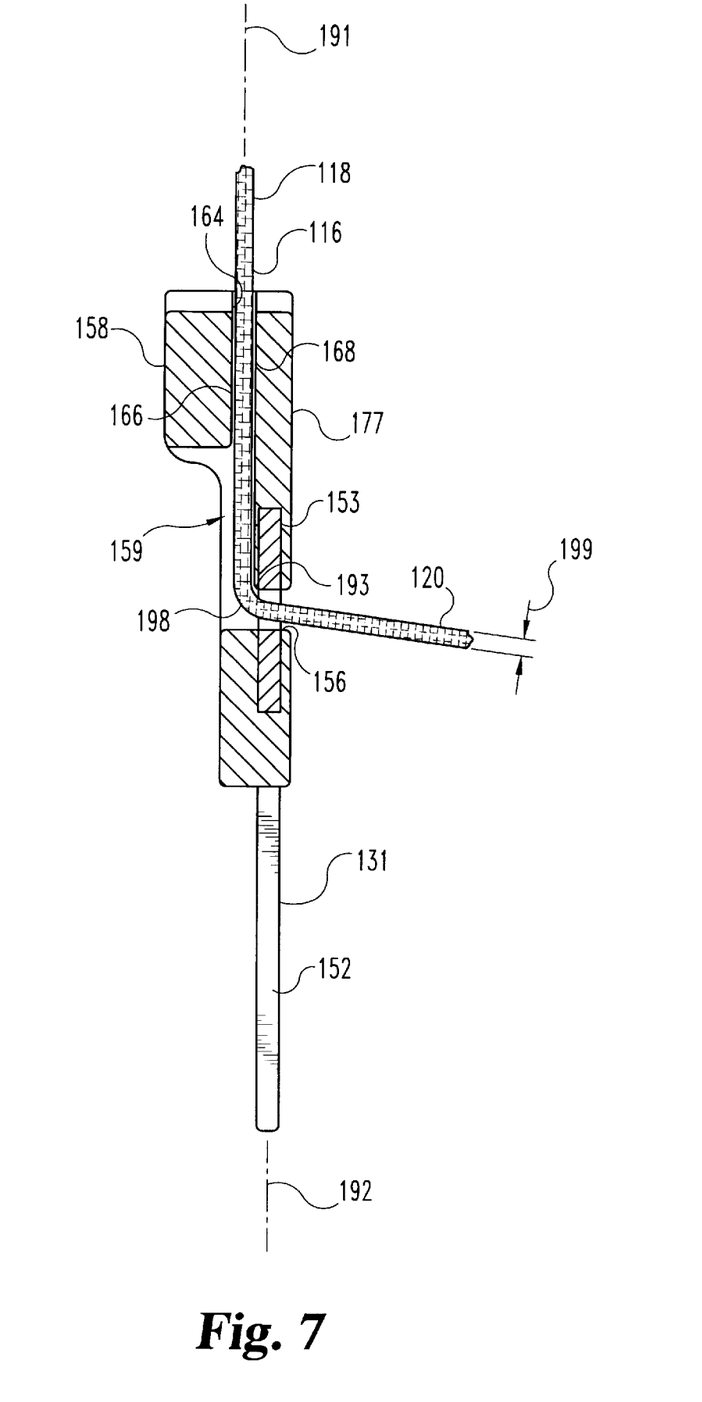
FIG. 7 is a cross-sectional side view taken along section line 7—7 of FIG. 4.

FIG. 7 is a cross-sectional side view of right tongue assembly 130 of FIG. 4 taken along section lines 7—7. FIG. 7 shows shoulder portion 118 extending through channel 164 defined by front wall 166 and back wall 168. Webbing 116 continues into open area 159 and then undergoes an approximate 90° turn to extend through slot 156 and out the back of the tongue assembly to form lap portion 120. As shown in FIG. 7, the longitudinal axis 191 of shoulder portion 118, also the longitudinal axis of channel 164, is in substantially parallel alignment with the longitudinal axis 192 of latch plate 152. This alignment will be substantially maintained by the engagement of web 118 with front wall 166. This engagement counteracts the tendency of the tongue assembly to rotate with respect to the webbing because of the routing of webbing 116 through slot 156.

Maintenance of tongue 131 in alignment with shoulder portion 118 provides a desirable low profile when the bottom 138 (FIG. 3) is folded upward and toward back 140 into the stowed position (not shown). Thus, the tongue assemblies of the present invention eliminate the need for the user to manually hold the tongues in a position substantially parallel with the shoulder portion of the webbing.

Additionally, routing of web 116 through channel 164 and slot 156 requires the webbing to undergo an approximately 90° turn 198 adjacent slot 156. Webbing turn 198 forcefully engages corner 193 to provide sufficient friction to prevent movement of tongue assembly 130 on webbing 116 without manual pressure applied by a user. This permits the user to set the tongue assembly 130 in the desired position during an initial use. This initial position will be maintained for subsequent use unless it is further modified by the user. As will be understood by those skilled in the art, maintenance of longitudinal axis 191 of webbing 118 in substantial alignment with longitudinal axis 192 of tongue 131 provides a substantially perpendicular relationship between shoulder portion 118 and lap portion 120, which forces engagement of webbing 116 with corner 193. As previously explained, this engagement prevents unwanted slippage of the tongue assembly 130 with respect to webbing 116.

Additionally, width 170 (FIG. 5) of channel 164 is sized less than twice the width 199 (FIG. 7) of webbing 116. Thus, channel 164 inhibits doubling and bunching of the webbing as it passes through angled slot 156. The routing of webbing 122 through left tongue assembly 132 is arranged in a mirror image of the routing of right webbing 116 through right tongue assembly 130 shown in FIG. 7 and provides identical features.

In use, right tongue assembly 130 is moved by manual pressure at depression 160 along webbing 116 to adjust the length of shoulder portion 118 and lap portion 120, respectively. In a similar fashion, left tongue assembly 132 is moved along webbing 122 by manual pressure at depression 176 to adjust the length of shoulder portion 124 and lap portion 126, respectively. Once the desired lengths of the respective webbing portions have been achieved, right tongue assembly is urged toward buckle 134 with the latch plate 152 extending into buckle 134 in a known fashion to provide a secure engagement. Left tongue assembly 132 is likewise urged toward buckle 134 and is positioned with second guiding surface 178 in alignment with corresponding first guiding portion 162 on the right tongue assembly 130. Left tongue assembly 132 is urged into buckle 134 until latch plate 154 is secured within buckle 134 in a known manner.

Buckle 134 may be activated to release latching plates 152 and 154. Once released, the occupant may be removed and the tongue assemblies 130 and 132 will hang from shoulder portions 118 and 124, respectively, as shown in FIG. 3. It is in this hanging position, when the web guides 158 and 174 of the present invention provide their greatest advantage. As previously described, channels 164 and 180 of tongue assemblies 130 and 132, respectively, maintain their respective tongues 131 and 133 in substantial alignment with shoulder portions 118 and 124, respectively. It will be understood that in most applications, shoulder portions 118 and 124 are positioned along and lay against seat back 140. Thus, web guides 158 and 174 urge tongue assemblies 130 and 132, respectively, to lay against seat back 140 with the smallest profile possible. Not only do the web guides prevent movement of tongue assemblies along the respective webs, they also are particularly beneficial with the folding child seat 112 shown in FIG. 3. It may be appreciated that absent the guides of the present invention to hold the tongue assembly substantially flat along seat back 140, the tongues may extend outwardly from seat back 140 and engage seat bottom 138 prior to its being positioned in its final folded position. In this circumstance, the user must manually align the prior art tongue assemblies with the back prior to completion of the folding operation. Use of the tongue assembly according to the present invention substantially eliminates the need for manual manipulation of the tongues during the seat folding operation.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A restraining system, comprising:
   a seat having a back and a bottom;
   a left webbing having a first portion engaging said back and an opposite second portion engaging said bottom;
   a right webbing having a first portion engaging said back and an opposite second portion engaging said bottom;
   a left tongue assembly disposed on said left webbing, said left tongue assembly separating said left webbing into a shoulder portion and a lap portion, said left tongue assembly including
      a first tongue having a front surface extending along a first plane and an opposite back surface, said tongue defining a first slot extending from said front surface to said back surface substantially transverse to said first plane, said first slot adapted to receive said left webbing; and a first webbing guide fixedly attached to said first tongue, said first webbing guide having a front wall and an opposite back wall, said first webbing guide defining a first channel extending between said first wall and said opposite back wall and substantially parallel to said first plane, said channel adapted to guide a portion of said shoulder portion, a portion of said first channel including a front wall and an opposing back wall;

a right tongue assembly disposed on said right webbing, said right tongue assembly separating said right webbing into a shoulder portion and a lap portion, said right tongue assembly including a second tongue having a second front surface extending along a second plane and an opposite second back surface, said second tongue defining a second slot extending from said second front surface to said second back surface substantially transverse to said second plane, said second slot adapted to receive said right webbing; and a second webbing guide fixedly attached to said second tongue, said second webbing guide having a front wall and an opposite back wall, said second webbing guide defining a second channel extending between said first wall and said opposite back wall and substantially parallel to said second plane, said second channel adapted to guide a portion of said right shoulder portion, at least a portion of said second channel including a front wall and an opposing back wall; and a buckle connected to said seat and adapted to receive said first latch plate and said second latch plate.

2. The restraining system of claim 1, wherein said seat is pivotal with respect to said back.

3. The restraining system of claim 1, wherein said first tongue includes a first latch plate having a first latch plate longitudinal axis; said first slot disposed at a non-orthoganol angle with respect to said first latch plate longitudinal axis, and said second tongue includes a second latch plate having a second latch plate longitudinal axis, said second slot disposed at a non-orthoganol angle with respect to said second latch plate longitudinal axis.

4. The restraining system of claim 1, wherein said left webbing has a first thickness and said first channel has width, said width is less than twice said first thickness to inhibit doubling of said left webbing within said first channel.

5. The restraining system of claim 1, wherein said first channel and said first slot are configured to inhibit movement of said left tongue on said left webbing absent manual force from the user to position the left tongue on said left webbing, whereby once the left tongue is positioned by the user, it will remain in the position until manually repositioned.

* * * * *